(12) United States Patent
Zettler (10) Patent No.: US 8,430,606 B2
(45) Date of Patent: Apr. 30, 2013

(54) CUTTING INSERT AND ROTARY CUTTING TOOL

(75) Inventor: Martin Zettler, Vaihingen-Horrheim (DE)

(73) Assignee: Iscar, Ltd., Tefen (IL)

( * ) Notice: Subject to any disclaimer, the term of this patent is extended or adjusted under 35 U.S.C. 154(b) by 453 days.

(21) Appl. No.: 12/839,008

(22) Filed: Jul. 19, 2010

(65) Prior Publication Data

US 2011/0020080 A1 Jan. 27, 2011

(30) Foreign Application Priority Data

Jul. 26, 2009 (IL) .......................................... 200063

(51) Int. Cl.
*B23C 5/20* (2006.01)
(52) U.S. Cl.
USPC ................. 407/42; 407/48; 407/61; 407/113
(58) Field of Classification Search .................... 407/34, 407/42, 48, 51, 53, 61, 113; *B23C 5/20*
See application file for complete search history.

(56) References Cited

U.S. PATENT DOCUMENTS

| | | | | |
|---|---|---|---|---|
| 7,494,303 B2* | 2/2009 | Koskinen | ...................... | 407/113 |
| 7,901,161 B2* | 3/2011 | Jansson | ......................... | 407/113 |
| 8,282,320 B2* | 10/2012 | Hartlohner et al. | ........... | 407/113 |
| 2007/0071561 A1* | 3/2007 | Agic | .............................. | 407/34 |
| 2009/0155005 A1 | 6/2009 | Jansson | | |

FOREIGN PATENT DOCUMENTS

| | | | |
|---|---|---|---|
| JP | 06015517 A | * | 1/1994 |
| JP | 2002066811 A | * | 3/2002 |
| JP | 2006231424 A | * | 9/2006 |

OTHER PUBLICATIONS

International Search Report in PCT/IL2010/000541, dated Nov. 25, 2010.

* cited by examiner

*Primary Examiner* — Daniel Howell
*Assistant Examiner* — Nicole N Ramos
(74) *Attorney, Agent, or Firm* — Womble Carlyle (57) ABSTRACT

An indexable cutting insert has first and second side surfaces and a peripheral surface extending therebetween. The peripheral surface has identical peripheral faces, each divided into two identical first and second cutting sections. Each cutting section has a first cutting edge, a second cutting edge, a corner cutting edge which extends between the first and second cutting edges and a rake surface having a planar rake surface flat forming an engagement surface. The rake surface meets the first side surface at the first cutting edge. The rake surface flat meets the second side surface at a rake surface open edge. On each peripheral face, the two cutting sections are non-coplanar. Each two rake surface flats associated with first cutting sections converge in a direction along an insert axis and the cutting edges are raised above the rake surface flat.

14 Claims, 5 Drawing Sheets

CUTTING INSERT AND ROTARY CUTTING TOOL

FIELD OF THE INVENTION

The present invention relates to the field of cutting tools, for example metal cutting tools, having cutting inserts detachably secured thereto. More specifically, it relates to an indexable cutting insert having a plurality of cutting portions for mounting tangentially in a milling cutter, for machining a 90° shoulder in a workpiece.

BACKGROUND OF THE INVENTION

U.S. Pat. No. 7,494,303 discloses an indexable cutting insert having a trigon shape for tangentially mounting in a milling cutter body. The cutting insert is provided with support surfaces for abutment against a pocket of the milling cutter body. The support surfaces project outwardly from sides of the cutting insert with an axial extension that is smaller or equal to half the thickness of the cutting insert. The outwardly projecting support surfaces may have an adverse effect on chip development and evacuation.

SUMMARY OF THE INVENTION

According to embodiments of the present invention, there is provided an indexable cutting insert comprising a first and second side surfaces and a peripheral surface extending therebetween. The first and second side surfaces are flat, polygonal in shape and parallel to each other. An insert axis B is perpendicular to the first and second side surfaces. The peripheral surface comprises identical peripheral faces, each divided into two identical first and second cutting sections, each peripheral face being located between two adjacent peripheral faces; each cutting section has a first cutting edge, a second cutting edge, a corner cutting edge which extends between the first and second cutting edges and a rake surface having a rake surface flat forming an engagement surface and a rake surface open edge, the rake surface meets the first side surface at the first cutting edge. The rake surface flat meets the second side surface at the rake surface open edge. On each peripheral face, the two cutting sections are non-coplanar. Each pair of rake surface flats associated with a corresponding pair of first cutting sections, converge in a direction along the insert axis B and the cutting edges are raised above the rake surface flat.

According to embodiments of the present invention, there is also provided a rotary cutting tool comprising a cutter body having an axis of rotation A defining a direction of rotation R about the axis of rotation A, the cutter body having a front end, a rear end and a tool peripheral surface extending therebetween; a plurality of cutting portions formed at and around a join region between the tool peripheral surface and the front end, each cutting portion having an insert pocket with the indexable cutting insert retained therein. The insert pocket opens out in the direction of rotation R and opening out to the tool peripheral surface, the insert pocket comprising a radially outwardly facing first abutment surface and a second, third and fourth abutment surfaces transverse thereto, a pocket screw bore opens out to the first abutment surface, the second and third abutment surfaces converge radially outwardly when the insert pocket is viewed in a direction opposite the direction of rotation R and converge in a direction opposite the direction of rotation R when viewed in a radial direction. The cutting insert is retained in the insert pocket with the second side surface in abutment with the first abutment surface, a first rake surface flat of a first peripheral face in abutment with the second abutment surface, a second rake surface flat of the first peripheral face in abutment with the fourth abutment surface and a first rake surface flat of a second peripheral face in abutment with the third abutment surface. Therefore, in general, rake surface flats form engagement surfaces for engaging abutment surfaces of the insert pocket of the cutting tool.

Further embodiments of the invention are provided in accordance with the dependent claims.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Figure 1:
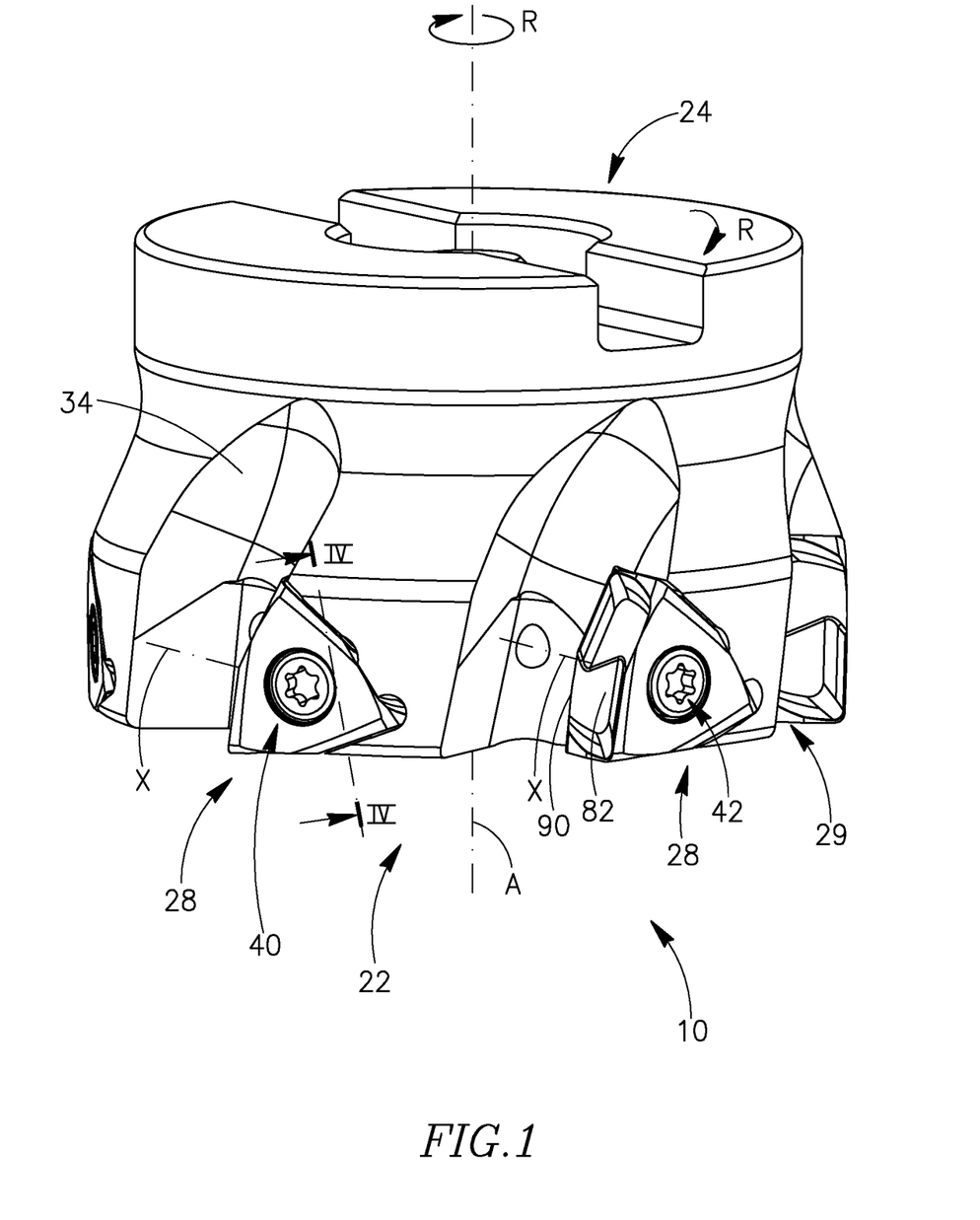
FIG. 1 is a view of a rotary cutting tool, on which cutting inserts are mounted according to embodiments of the present invention.

Reference is made to the figures in general and specifically to FIG. 1, showing according to embodiments of the present invention, a rotary cutting tool 10. The cutting tool 10 has a cutter body 20 having an axis of rotation A defining a direction of rotation R about the axis of rotation A. The cutter body 20 has a front end 22, a rear end 24 and a tool peripheral surface 26 extending therebetween. A plurality of cutting portions 28 are formed at a join region 29 connecting the tool peripheral surface 26 and the front end 22. Each cutting portion 28 has an insert pocket 30, a flute 34, an optional cooling channel 36 opening into the flute 34 and an indexable cutting insert 40 retained in the insert pocket 30 by a screw 42. The cutting insert 40 is typically made of extremely hard and wear-resistant material such as cemented carbide, either by form-pressing or by injection molding and sintering carbide powders in a binder. The cemented carbide may be, for example, tungsten carbide. The cutting insert may be coated or uncoated.

Figure 2:
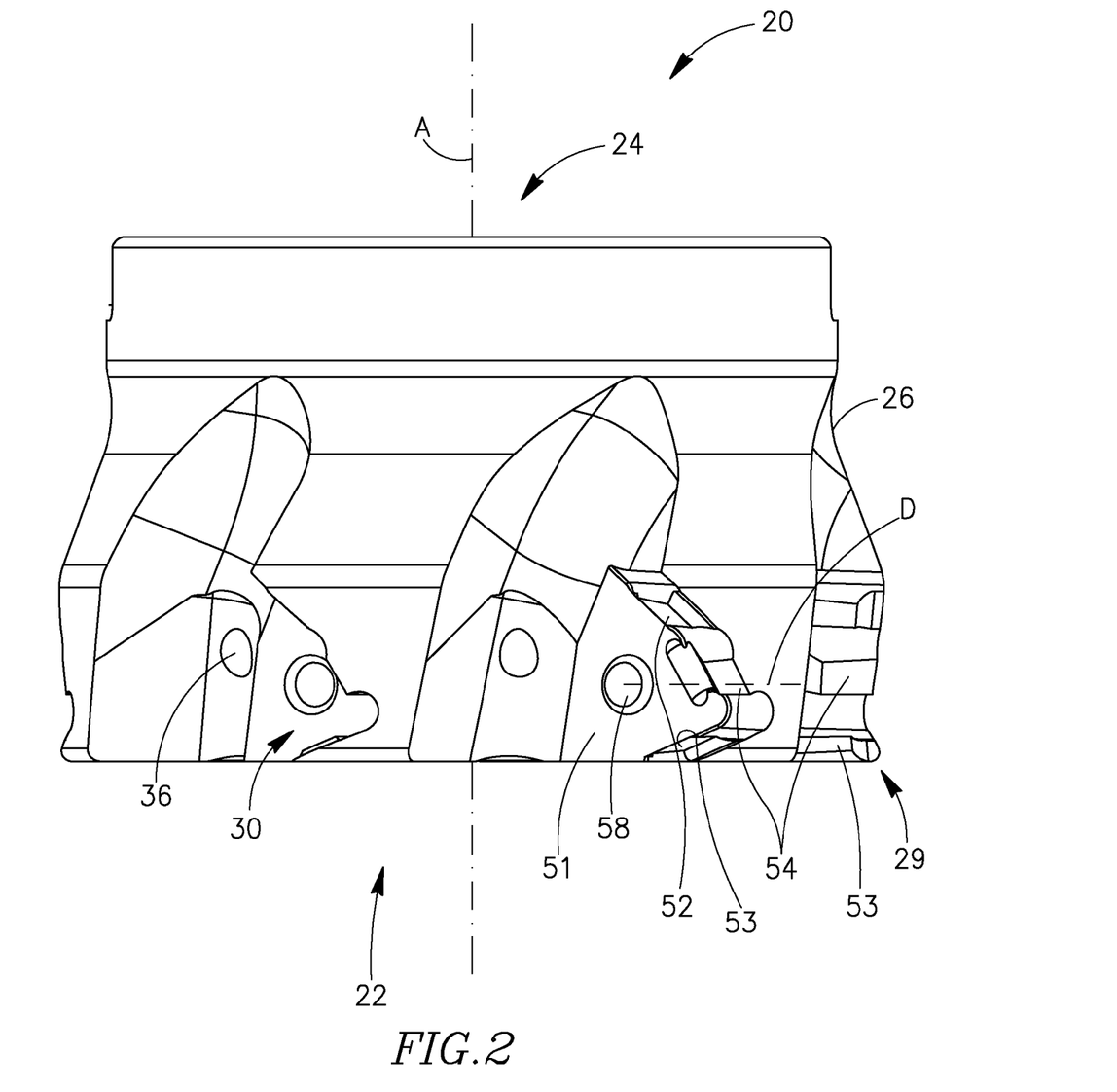
FIG. 2 is a side view of the cutter body of the cutting tool of FIG. 1.

Reference is made to FIG. 2 showing a side view of the cutter body 20. The insert pockets 30 open out in the direction of rotation R and open out to the tool peripheral surface 26. The insert pocket 30 has a radially outwardly facing first abutment surface 51 and a second, third and fourth abutment surfaces 52, 53, 54 transverse thereto. A pocket screw bore 58 opens out to the first abutment surface 51. The second and third abutment surfaces 52, 53 converge radially outwardly when the insert pocket 30 is viewed in a direction opposite the direction of rotation R (as can be seen on the right-hand side of FIG. 2 and in the cross section shown in FIG. 4). The second and third abutment surfaces 52, 53 converge in a direction opposite the direction of rotation R to form an acute angle when viewed in a radial direction (as can be seen in FIGS. 1, 2 and 5).

Figure 3:
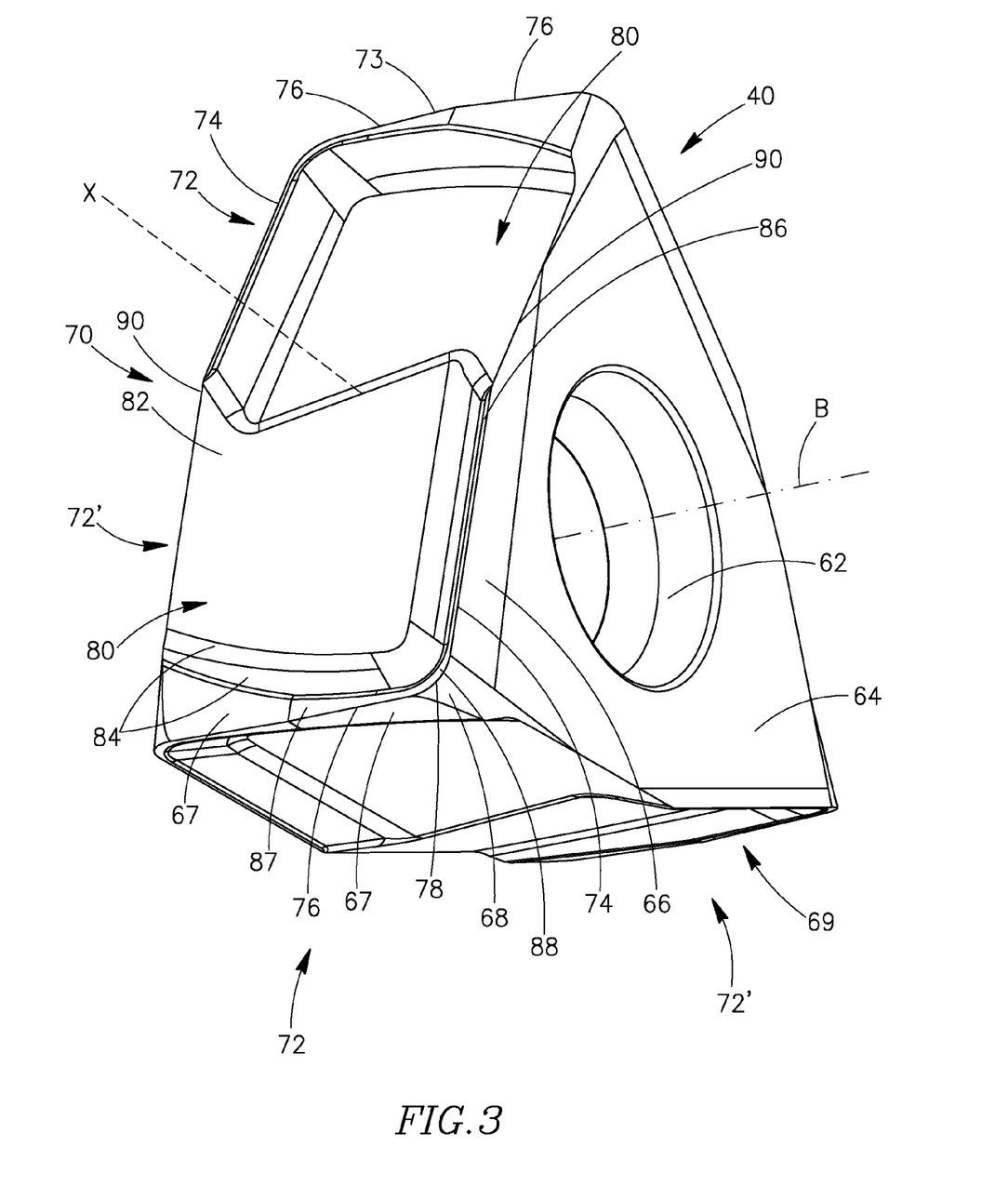
FIG. 3 is an isometric view of the cutting insert of FIG. 1.

Reference is now made to FIG. 3, showing the cutting insert 40. The cutting insert 40 has two identical opposing first and second side surfaces 64, 64' (see also FIG. 4) and a peripheral surface 69 extending therebetween. The cutting insert has an insert axis B perpendicular to the two side surfaces 64, 64'. An insert screw bore 62 extends between the side surfaces 64, 64' and has the insert axis B as its axis. The side surfaces 64, 64' may be flat, polygonal in shape and parallel to each other. The side surfaces 64, 64' may be 120° rotationally symmetric about the insert axis B. The peripheral surface 69 has three identical peripheral faces 70, each peripheral face 70 is located between two adjacent peripheral faces 70 and has two identical cutting sections 72, 72', a first cutting section 72 opening to the first side surface 64 and a second cutting section 72' opening to the second side surface 64'.

Each peripheral face 70 has a central axis X about which it is 180° rotationally symmetric. The central axis X is perpendicular to the insert axis B. The two cutting sections 72, 72' on each peripheral face 70 may be non-coplanar. The cutting insert 40 may be 120° rotationally symmetric about the insert axis B. Each cutting section 72, 72' has first and second cutting edges 74, 76 and a corner cutting edge 78 which extends between the first and second cutting edges 74, 76. Adjacent peripheral faces 70 meet at a joint edge 73 which contains the second cutting edges 76 of the adjacent peripheral faces 70. Each cutting section 72, 72' has a rake surface 80, along which chips removed from a workpiece may flow. The rake surface 80 has a rake surface flat 82, a rake surface slope 84 and a rake surface open edge 90. For each first cutting section 72 the rake surface open edge 90 is formed at the junction of the rake surface flat 82 with the first side surface 64. For each second cutting section 72' the rake surface open edge 90 is formed at the junction of the rake surface flat 82 with the second side surface 64'. Clearly, each rake surface open edge 90 is located in the surface of its associated rake surface flat 82 as well as in the surface of its associated side surface (64, 64').

According to some embodiments, the rake surface flats 82 are parallel to the insert axis B. In accordance with other embodiments, the rake surface flats 82 are sloped with respect to the insert axis B.

For each of the cutting sections 72, 72', the cutting edges 74, 76, 78 are located at a greater distance from the insert axis B than the rake surface flat 82 and the rake surface open edge 90. In other words, for each of the cutting sections 72, 72' the cutting edges 74, 76, 78 are raised above an associated rake surface flat 82 and rake surface open edge 90, relative to the insert axis B.

The first, second and corner cutting edges 74, 76 and 78 are formed at the intersection of the rake surface slope 84 and a first relief surface 66, a second relief surface 67 and a corner relief surface 68, respectively. Each first relief surface 66 is located in a respective side surface (64, 64') and each corner relief surface 68 is located between adjacent first and second relief surfaces 66, 67. For each second cutting edge 76 of a given cutting section 72, 72' the associated second relief surface 67 is located in an adjacent cutting section 72, 72'.

According to some embodiments of the present invention, the first, second and corner cutting edges 74, 76 and 78 may have associated first, second and corner edge lands 86, 87 and 88, respectively. The first, second and corner edge lands 86, 87 and 88 being located between associated first, second and corner cutting edges 74, 76 and 78 and an associated rake surface slope 84. In accordance with some embodiments, the edge lands 86, 87, 88 may be coplanar. The corner edge land 88 and the adjacent second edge land 87 both may increase in width in a direction away from an associated corner cutting edge 78. This optional feature of increasing width is designed to reinforce the cutting edges 74, 76, 78.

Since the second cutting edges 76 of adjacent peripheral faces 70 are located on the same joint edge 73, each given cutting edge section 72, 72' contains an adjacent pair of surfaces: a second edge land 87 associated with the second cutting edge 76 of the given cutting edge section 72, 72' and a second relief surface 67 associated with the second cutting edge 76 of an adjacent cutting edge section 72, 72'. In accordance with some embodiments, the second relief surface 67 and the second edge land 87 of each adjacent pair are non-coplanar. In accordance with other embodiments, the second relief surface 67 and the second edge land 87 of each adjacent pair are coplanar.

Figure 4:
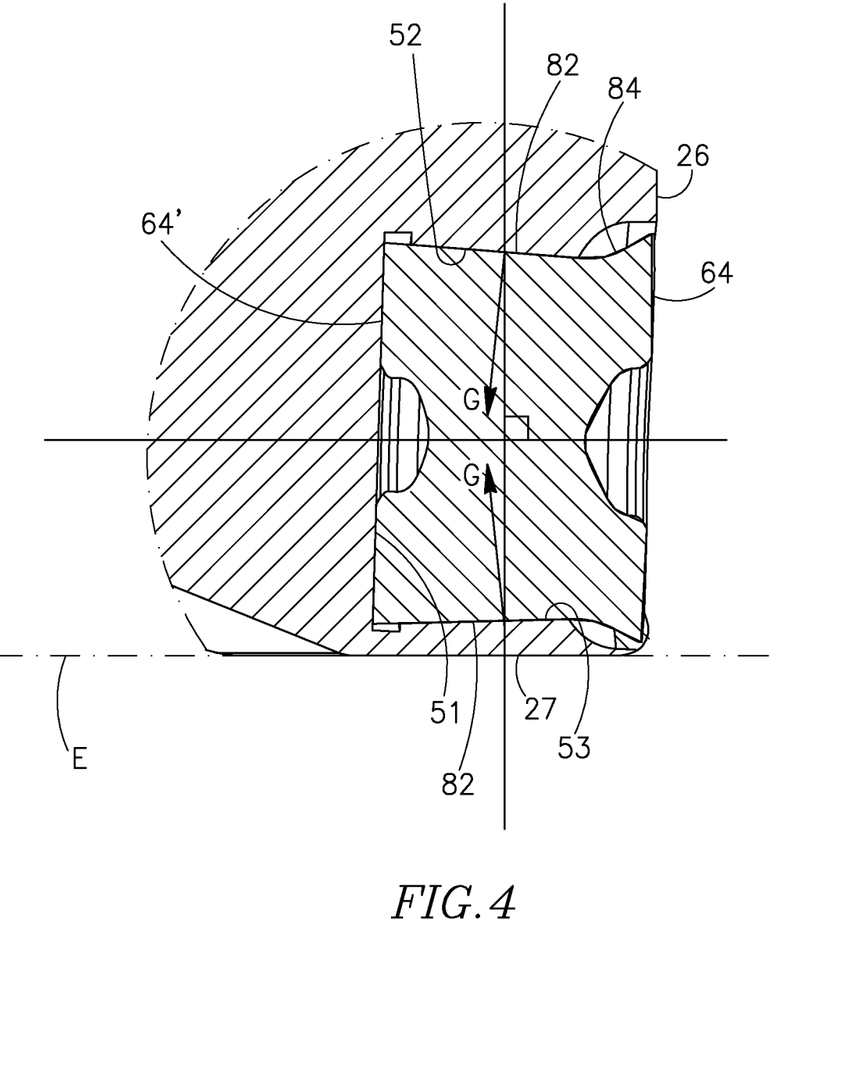
FIG. 4 is a cross section of the rotary cutting tool of FIG. 1 taken along the line IV-IV of FIG. 1.
Figure 5:
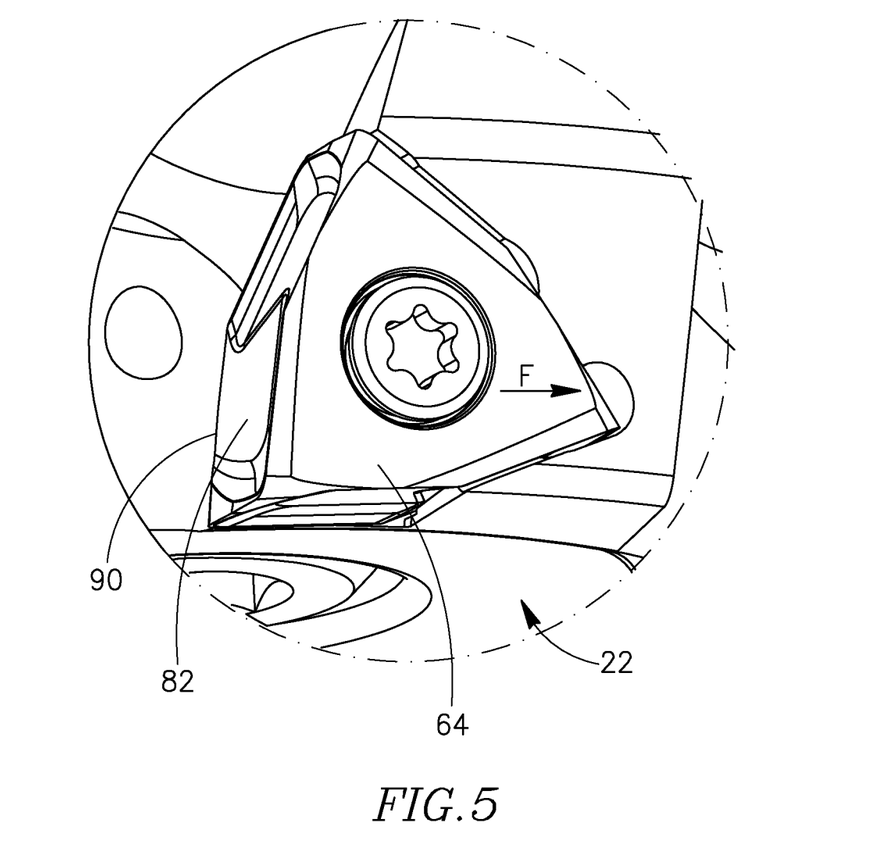
FIG. 5 is a detail of FIG. 1.

Reference is now made to FIG. 5 in conjunction with FIGS. 2, 3 and 4, showing the cutting insert 40 mounted on the cutting tool 10. The cutting insert 40 is retained in the insert pocket 30 with the second side surface 64' in abutment with the first abutment surface 51 (shown in FIG. 4).

A first rake surface flat 82 of a non-operative first peripheral face 70 is in abutment with the second abutment surface 52, a second rake surface flat 82 of the non-operative first peripheral face 70 is in abutment with the fourth abutment surface 54 and a first rake surface flat 82 of a non-operative second peripheral face 70 is in abutment with the third abutment surface 53. Therefore, in general, rake surface flats 82 form engagement surfaces for engaging the second, third and fourth abutment surfaces (52, 53, 54) of the insert pocket 30 of the cutting tool 10. The abutment of the first rake surface flat 82 of the first peripheral face 70 with the second abutment surface 52 and the abutment of the first rake surface flat 82 of a second peripheral face 70 with the third abutment surface 53 is made possible due to the fact that the rake surface flats 82 are oriented in a similar manner to the orientation of the second and third abutment surfaces 52, 53. Specifically, the two rake surface flats 82 of a given peripheral face 70 slope in opposite directions relative to the insert axis B. Therefore, the two rake surface flats 82 of adjacent non-operative peripheral faces 70 that are abutted by the second and third abutment surfaces 52, 53 converge, relative to the insert axis B, towards a given side surface 64, 64' of the cutting insert 40. In other words, non-adjacent rake surface flats 82 of adjacent peripheral faces 70 converge, relative to the insert axis B, towards a given side surface 64, 64' of the cutting insert 40.

The cutting insert 40 is firmly held in place by the screw 42, which is inserted through the insert screw bore 62 and threadingly received in the pocket screw bore 58. Since the pocket screw bore 58 is designed with a certain eccentricity with respect to the insert screw bore 62, tightening of the screw 42 urges the cutting insert 40 into a rear corner of the insert pocket 30, that is, in the general direction of the arrow F (shown in FIG. 5).

In accordance with some embodiments, the rake surface flat 82 is a preferably planar surface and is the largest portion of the cutting sections 72, 72'. As described above, the rake surface flats 82 are used as abutment surfaces when the cutting insert 40 is secured in the insert pocket 30. In comparison with the insert disclosed in U.S. Pat. No. 7,494,303, the relatively large surface area of the rake surface flats 82 is an advantageous use of space of the cutting sections 72, 72'. In some embodiments, the rake surface flats 82 are generally matched in size by their corresponding abutment surfaces 52, 53, 54 of the insert pocket 30. Also, while each rake surface flat 82 is seen as a single continuous surface in the embodiments shown, it may in other embodiments comprise a plurality of spaced apart coplanar surfaces.

A further advantage of the present invention is that there are no obstacles on the rake surfaces 80 so that chips cut from a workpiece can flow freely along the rake surface 80. Moreover, the chips can be easily evacuated since they can exit the cutting insert 40 via the rake surface open edge 90 directly to an adjacent flute 34. This is the case since the rake surface open edge 90 is located in the plane of the rake surface flat 82 and therefore forms an "opening" through which the chips can exit without being obstructed.

When the cutting insert 40 is secured in the insert pocket 30, the radially outwardly converging surfaces both of the cutting insert 40 (rake surface flats 82 that abut the second and third abutment surfaces 52, 53 respectively) and the insert pocket 30 (second and third abutment surfaces 52, 53) allow for the abutting forces G (shown in FIG. 4) to have a component directed radially inwards. These forces help confine the cutting insert 40 in the insert pocket 30 by acting in opposition to the centrifugal forces generated due to rotation of the cutting tool 10.

In the preferred embodiment, the first cutting edge 74 lies on a helical spline. In other embodiments, the first cutting edge 74 may lie on a straight line, a part of an ellipse or any other desired spline.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. An indexable cutting insert (40) comprising:
   first and second side surfaces (64, 64') which are flat, polygonal in shape and parallel to each other;
   an insert axis (B) perpendicular to the first and second side surfaces (64, 64');
   a peripheral surface (69) extending between the first and second side surfaces (64, 64'), the peripheral surface (69) comprising identical peripheral faces (70), each peripheral face (70) being located between two adjacent peripheral faces (70) and being divided into two identical first and second cutting sections (72, 72'), each cutting section having:
      a first cutting edge (74), a second cutting edge (76), and a corner cutting edge (78) which extends between the first and second cutting edges (74, 76); and
      a rake surface (80) meeting the first side surface (64) at the first cutting edge (74), the rake surface having a rake surface flat (82) forming an engagement surface and a rake surface open edge (90), the rake surface (80) meeting the first side surface (64) at the first cutting edge (74);
   wherein:
      the rake surface flat (82) meets the second side surface (64') at the rake surface open edge (90);
      on each peripheral face (70), the two cutting sections (72, 72') are non-coplanar;
      each pair of rake surface flats (82) associated with a corresponding pair of first cutting sections (72), converge in a direction along the insert axis (B); and
      the cutting edges (74, 76, 78) are raised above the rake surface flat (82).

2. The cutting insert (40) according to claim 1, wherein adjacent peripheral faces (70) meet at a joint edge (73) which contains the second cutting edges (76) of the adjacent peripheral faces (70).

3. The cutting insert (40) according to claim 1, wherein each peripheral face (70) is 180° rotationally symmetric about a central axis (X) of the peripheral face (70), the central axis (X) being perpendicular to the insert axis (B).

4. The cutting insert (40) according to claim 1, wherein the rake surface flat (82) is the largest part of each cutting section (72, 72').

5. The cutting insert (40) according to claim 1, wherein each side surface (64, 64') is 120° rotationally symmetric about the insert axis (B).

6. The cutting insert (40) according to claim 1, wherein the cutting insert (40) is 120° rotationally symmetric about the insert axis (B).

7. The cutting insert (40) according to claim 1, wherein:
   each rake surface flat (82) comprises a single continuous surface.

8. The cutting insert (40) according to claim 1, wherein:
   each rake surface flat (82) comprises a plurality of spaced apart coplanar surfaces.

9. A rotary cutting tool (10) comprising:
   a cutter body (20) having an axis of rotation (A) defining a direction of rotation (R) about the axis of rotation (A), the cutter body (20) having a front end (22), a rear end (24) and a tool peripheral surface (26) extending therebetween;
   a plurality of cutting portions (28) formed at and around a join region (29) between the tool peripheral surface (26) and the front end (22), each cutting portion (28) having an insert pocket (30) with an indexable cutting insert retained therein, wherein:
   the indexable cutting insert comprises a cutting insert in accordance with claim 1.

10. The rotary cutting tool (10) according to claim 9, wherein:
   the insert pocket (30) opens out in the direction of rotation (R) and opens out to the tool peripheral surface (26), the insert pocket (30) comprising a radially outwardly facing first abutment surface (51) and a second, third and fourth abutment surfaces (52, 53, 54) transverse thereto, a pocket screw bore (58) opening out to the first abutment surface (51), the second and third abutment surfaces (52, 53) converging radially outwardly when the insert pocket (30) is viewed in a direction opposite the direction of rotation (R) and converge in a direction opposite the direction of rotation (R) when viewed in a radial direction; and
   the cutting insert (40) is retained in the insert pocket (30) with the second side surface (64') in abutment with the first abutment surface (51), a first rake surface flat (82) of a first non-operative peripheral face (70) in abutment with the second abutment surface (52), a second rake surface flat (82) of the first peripheral face (70) in abutment with the fourth abutment surface (54) and a first rake surface flat (82) of a second non-operative peripheral face (70) in abutment with the third abutment surface (53).

11. The rotary cutting tool (10) according to claim 9, wherein adjacent second cutting edges (76) of adjacent peripheral faces (70) lie on a line shared by adjacent peripheral faces (70).

12. The rotary cutting tool (10) according to claim 9, wherein each peripheral face (70) is 180° rotationally symmetric about a central axis (X) of the peripheral face (70), the central axis (X) being perpendicular to the insert axis (B).

13. The rotary cutting tool (10) according to claim 9, wherein the rake surface flat (82) is the largest part of the cutting sections (72, 72').

14. The rotary cutting tool (10) according to claim 9, wherein each side surface (64, 64') is 120° rotationally symmetric about the insert axis (B).

\* \* \* \* \*

UNITED STATES PATENT AND TRADEMARK OFFICE
CERTIFICATE OF CORRECTION

PATENT NO. : 8,430,606 B2  
APPLICATION NO. : 12/839008  
DATED : April 30, 2013  
INVENTOR(S) : Martin Zettler

Page 1 of 1

It is certified that error appears in the above-identified patent and that said Letters Patent is hereby corrected as shown below:

In the Claims

In Claim 1, column 5, lines 62-64, delete:
"the rake surface (80) meeting the first side surface (64) at the first cutting edge (74);"

Signed and Sealed this
Seventh Day of January, 2014

Margaret A. Focarino
*Commissioner for Patents of the United States Patent and Trademark Office*